(12) United States Patent
Pabedinskas

(10) Patent No.: US 7,318,720 B2
(45) Date of Patent: Jan. 15, 2008

(54) DIE ASSEMBLY AND PRODUCTION PROCESS FOR PROFILE EXTRUSION

(76) Inventor: Arunas Antanas Pabedinskas, 12 Laurel Ave., Etobicoke (CA) M9B 4S8

( * ) Notice: Subject to any disclaimer, the term of this patent is extended or adjusted under 35 U.S.C. 154(b) by 412 days.

(21) Appl. No.: 10/635,851

(22) Filed: Aug. 7, 2003

(65) Prior Publication Data

US 2005/0031724 A1   Feb. 10, 2005

(51) Int. Cl.
*B29C 47/12* (2006.01)
*B29C 47/90* (2006.01)

(52) U.S. Cl. ............... 425/378.1; 425/380; 425/382.4; 425/467

(58) Field of Classification Search ............ 425/378.1, 425/380, 382.4, 467
See application file for complete search history.

(56) References Cited

U.S. PATENT DOCUMENTS

| | | | |
|---|---|---|---|
| 3,497,915 A * | 3/1970 | Ronden ............... 425/192 R |
| 3,792,951 A * | 2/1974 | Meyers ................ 425/326.1 |
| 3,899,276 A * | 8/1975 | Sokolow ................ 425/380 |
| 4,402,898 A * | 9/1983 | Rosenbaum ......... 264/171.27 |
| 4,826,422 A * | 5/1989 | Hunter .................. 425/461 |
| 5,082,605 A | 1/1992 | Brooks et al. |
| 5,088,910 A | 2/1992 | Goforth et al. |
| 5,096,046 A | 3/1992 | Goforth et al. |
| 5,261,988 A * | 11/1993 | Dikis et al. ............ 156/244.13 |
| 5,516,472 A | 5/1996 | Laver |
| 5,725,939 A | 3/1998 | Nishibori |
| 5,759,680 A | 6/1998 | Brooks et al. |
| 5,851,469 A | 12/1998 | Muller et al. |
| 6,080,346 A * | 6/2000 | Jack .................... 264/143 |
| 6,210,616 B1 | 4/2001 | Suwanda |
| 6,296,465 B1 * | 10/2001 | Deutsch et al. .......... 425/133.1 |
| 6,527,532 B1 | 3/2003 | Muller et al. |
| 6,769,899 B2 * | 8/2004 | Groeblacher et al. ....... 425/381 |
| 2002/0180085 A1 * | 12/2002 | Rothemeyer ............... 264/68 |

OTHER PUBLICATIONS

"Profile Extrusion of Highly filled Recycled HDPE", Charlton et al., SPE ANTEC, May 2000, pp. 2914-2918.

* cited by examiner

*Primary Examiner*—Yogendra Gupta
*Assistant Examiner*—Emmanuel S. Luk
(74) *Attorney, Agent, or Firm*—Nancy E. Hill; Hill & Schumacher

(57) ABSTRACT

The invention discloses an improved die assembly for the extrusion of thermoplastic resin cellulosic fiber composite profiles meant to minimize and substantially prevent the occurrence of melt fracture on the surface of the extruded composite profiles. Comprising the die assembly are a balanced flow passage having a heated compression zone, a heated transition zone, a heated converging die zone, a die land, which corresponds to at least a portion of the downstream end of the flow passage and is cooled to temperature below the melting point temperature of the thermoplastic resin. The invention also discloses a production process for composite profiles which includes the steps of providing resin and fiber, producing a composite compound, processing the compound through an extrusion system, extruding the compound through the die assembly to form the desired profile, cooling the profile and cutting it to length. Also disclosed are products produced by the production process.

11 Claims, 7 Drawing Sheets

DIE ASSEMBLY AND PRODUCTION PROCESS FOR PROFILE EXTRUSION

FIELD OF THE INVENTION

This invention is directed to an improved die assembly and production process for the extrusion of thermoplastic resin cellulosic fiber composite profiles which are meant to minimize and substantially prevent the occurrence of melt fracture on the surface during extrusion of the composite profiles and composite profiles produced by said production process.

BACKGROUND TO THE INVENTION

Cellulosic fiber composites, which are used as wood substitute materials, have been available for many years. These composites, which include particle board, medium density fiber board (MDF), oriented strand board (OSB) and laminated veneer lumber(LVL) among others, typically consist of wood particles of various sizes (depending on the product being produced) which are bound together with a relatively small fraction (5% to 15% on a weight basis) of thermosetting resin such as urea-formaldehyde or methy-diphenyl-isocyanate (MDI). In addition to wood particles, these products have been produced using cellulosic agricultural materials such as straws or fibers such as hemp, jute and kenaf. While these products have been used successfully in a large number of applications as substitutes for solid wood, their use has been typically limited to applications which do not expose them to moisture, since they can deteriorate very quickly in wet or even highly humid environments. As such, they have seen very limited use in outdoor applications.

In order to overcome the poor moisture resistance of thermosetting resin cellulosic fiber composites, much attention and effort has been focussed recently on developing cellulosic fiber composites which use thermoplastic resins as a binder or matrix. These thermoplastic resin cellulosic fiber composites typically contain from 40% to 80% (on a weight basis) of cellulosic material typically derived from waste wood or cellulosic agricultural byproducts. Because of the higher resin content and the moisture resistant nature of the thermoplastic resins used in the production of these products, most thermoplastic resin cellulosic fiber composites typically perform substantially better than thermosetting resin cellulosic fiber composites in wet environments, and as such have developed a niche in outdoor applications such as decking, fencing and siding, among others. In this application, it is these thermoplastic resin cellulosic fiber composites which are being referred to when the term composite is used.

While thermosetting resin cellulosic fiber composites are typically produced via compression molding based processes, the majority of thermoplastic resin cellulosic fiber composites are produced via extrusion processes similar to the processes used to produce sheet, profile, pipe and the like from thermoplastic resins containing little or no filler. Most recent developments in the extrusion of thermoplastic resin cellulosic fiber composites have focussed on profile extrusion processes in order to produce profiles which could substitute for standard lumber (i.e. 2×4's, 2×6's, 1×8's, etc.) or milled wood profiles such as various window and door components. However, due to the typically high cellulose fiber content (40 to 80 weight percent), the extrusion of composite profiles presents challenges which are not typical of other extrusion processes.

The most significant issue in extruding composite profiles is the occurrence of melt fracture. In a paper titled "Profile Extrusion of Highly Filled Recycled HDPE" Suwanda, et al. describes melt fracture as a large scale deformation of the surface of the extrudate as it leaves the die resulting in tears in the extrudate and an unacceptably rough surface finish. Suwanda, et al. reported the occurrence of melt fracture for the extrusion of both solid and hollow composite profiles with the severity of the melt fracture increasing with decreasing die land temperature and increasing throughput. U.S. Pat. Nos. 5,082,605, 5,088,910, 5,096,046 and 5,759,680 issued to Advanced Environmental Recycling Technologies, Inc. of Springdale, Ark., discuss the possibility of the surface of the extrudate tearing as it exits the extrusion die when extruding composite profiles. Similarly, U.S. Pat. Nos. 5,851,469 and 6,527,532 issued to the Trex Company, LLC, Winchester, Va., describe how shear stress that develops between the extrudate and the die wall causing tears and roughness in the finished surface of the composite profile. In U.S. Pat. No. 5,725,939, Nishibori observed that in a conventional sheet die, the large frictional resistance of the inner surfaces of the die causes the composite material being extruded not to flow smoothly causing the extrudate to be non-uniform and for cavities to form in the extrudate.

In U.S. Pat. Nos. 5,088,910 and 5,096,046, Goforth, et al. disclose a process for producing solid composite profiles from a composite material comprising recycled thermoplastic resins and cellulosic fiber derived from waste wood by extruding the composite material through a heated die to produce an extrudate with a cross-section corresponding to that of the desired profile. Goforth, et al. teach that in order to overcome the occurrence of melt fracture, the surface temperature of the extrudate must be sufficiently high at the point where it exits the extruder to create a uniform surface and that if the proper surface temperature is not maintained, the surface of the extrudate may tear as it exits the extruder die. Similarly, in U.S. Pat. Nos. 5,082,605 and 5,759,680, Brooks, et al. teach that increasing the surface temperature within the heated die will improve the surface finish of the extrudate when extruding composite profiles.

In U.S. Pat. Nos. 5,851,469 and 6,527,532, Muller, et al. discloses a process for producing solid composite profiles, which consists of extruding a molten mass of composite material through a heated converging die to produce a shaped extrudate, which is then fed through a low friction thermally insulating land section into a passage connected to the insulating land which contains a cooling medium, such as water, that cools the extrudate enough to form a substantially dimensionally stable outer shell around the profile. The purpose of the low friction land section is to reduce the drag on the composite material in the land section thereby improving the surface finish of the extrudate by preventing melt fracture while the cooling medium is meant to preserve the surface finish by quickly solidifying the surface layer of the profile.

In U.S. Pat. No. 6,210,616, Suwanda discloses an extrusion process for producing composite profiles, which includes extruding a composite material comprising thermoplastic resin and cellulosic fibers through a die at a temperature above the softening point of the resin to form an extrudate having a desired cross-sectional shape, passing the extrudate through a die land and then feeding the extrudate through a thermal barrier insert member to a cooled shaper that is maintained at a temperature of about at least 20° C. below the softening point of the resin in order to solidify the outer skin of the profile sufficiently to maintain the shape of the profile after it exits the cooled shaper. Suwanda teaches that, without the cooled shaper of his invention, the extrudate would melt fracture.

U.S. Pat. No. 5,725,939 to Nishibori describes a process for producing composite profiles in which a mixture of thermoplastic resin and cellulosic fibers is extruded through a die whose inner walls are covered or coated with a layer of material, such as a fluoro resin, that has an extremely small coefficient of friction. The purpose of the low friction layer is to reduce the forces exerted on the extrudate by the die surfaces in order to extrude the desired composite profile without generating a rough surface.

U.S. Pat. No. 5,516,472 to Laver discloses an extrusion process for producing composite profiles in which the thermoplastic resin and cellulosic fibers are first dry-blended and then melt blended in an extruder. In addition to the thermoplastic resin, Laver also includes from 2.5% up to 20% by weight of thermosetting resin in his preferred material formulation. The blended material is extruded through a die system comprising a transition die, a stranding die and a molding die, wherein the transition die preforms the blended material to a shape approaching that of the end product, the stranding die forms individual strands from the blended material, and the molding die compresses the individual strands into the desired profile. Laver claims that his die system configuration and formulation allows the blended material to be processed at lower temperatures than those typically used to combine cellulosic fibrous material with thermoplastic resin, and because of the low temperatures, the die system configuration, and the individual strands used to form the final shape, traditional flow problems associated with solid part extrusion are eliminated.

While the above approaches to reducing the occurrence of melt fracture during the extrusion of composite profiles have been used with varying degrees of success to produce composite profiles with improved surface finishes, these approaches also have their drawbacks. Increasing the temperature of the die or the surface of the extrudate as is taught by Goforth, et al. and Brooks, et al. can result in degradation or burning of the cellulosic fibers if the die temperature is sufficiently high, thereby creating a burned appearance on the surface of the composite profile. Using a low friction land section to reduce the drag on the surface of the profile in the land section in combination with a passage connected to the land which contains a cooling medium as is taught by Muller, et al. is not easily adapted for the production of hollow articles. In addition, the abrasive nature of thermoplastic resin cellulosic fiber composite could cause substantial wear of the low friction land thereby changing the cross-section of the extruded profile with increasing wear. Using a cooled shaper to solidify the surface of the profile in order to prevent melt fracture as is taught by Suwanda has a substantial disadvantage, particularly with hollow profiles, in that once the surface of the profile is solidified, the ability to use the various methods known in the art to calibrate or maintain the desired cross-section of the extruded profile during cooling can be significantly limited. Nishibori's use of a die with inner walls that are covered or coated with a layer of material, such as a fluoro resin, that has an extremely small coefficient of friction has a disadvantage similar to Muller, et al. in that the abrasive nature of composite material could cause substantial wear of the low friction die wall material, thereby changing the cross-section of the extruded profile over time. Finally, the stranding die taught by Laver results in a composite profile which is not homogeneous in that there are no cellulosic fibers bridging the interfaces between the individual strands. This results in composite profiles which can easily crack between the strands when fasteners such as nails or screws are driven through the profile.

Therefore it would be desirable to have an improved die assembly for the extrusion of thermoplastic resin cellulosic fiber composite profiles meant to minimize and substantially prevent the occurrence of melt fracture on the surface of the extruded profiles. Preferably, the occurrence of melt fracture would be minimized and substantially prevented with out the need for die temperatures which could possibly cause burning of the composite material or the need of low friction surfaces within the die assembly which can wear and thereby change the cross-section of the extruded profile. It is also desirable that the die assembly would be adapted to produce both solid and hollow composite profiles without solidifying the profile in the die assembly prior to calibration of the profile. Additionally, it is desirable to produce composite profiles without the need for a stranding die in the die assembly, so as to prevent cracking between the strands when fasteners such as nails or screws are driven through the profiles. It is also desirable to have processes which would incorporate the use of the improved die assembly to produce solid and hollow thermoplastic resin cellulosic fiber composite profiles.

SUMMARY OF THE INVENTION

The present invention overcomes the disadvantages in the prior art by providing an improved die assembly for the extrusion of thermoplastic resin cellulosic fiber composite profiles meant to minimize and substantially prevent the occurrence of melt fracture on the surface of the extruded profiles.

The die assembly of the present invention is designed for the continuous production of a thermoplastic resin and cellulosic fiber composite profile having a desired cross-section and an exterior surface, wherein the die assembly has an axis oriented from an upstream end to a downstream end. Comprising the die assembly are: a flow passage through the die assembly that results in a generally balanced flow of the thermoplastic resin and cellulosic fiber composite compound from an upstream inlet to a downstream outlet that are displaced along the axis of the die assembly; a heated compression zone that has an inlet which corresponds to the die assembly inlet and an outlet which corresponds to at least a portion of the upstream end of the flow passage through the die assembly; a heated transition zone that has an inlet and an outlet, wherein the inlet of the transition zone corresponds to the outlet of the compression zone; a heated converging die zone that has an inlet and an outlet, wherein the inlet of the die zone corresponds to the outlet of the transition zone and the outlet of the die zone generally corresponds to the cross-section of the desired composite profile; a die land with an inlet and an outlet, wherein the die land corresponds to at least a portion of the downstream end of the flow passage through the die assembly, the inlet of the die land corresponds to the outlet of the die zone, the outlet of the die land corresponds to the outlet of the die assembly and the cross-section of die land at the outlet corresponds to the cross-section of the desired composite profile; a cooling means to maintain the temperature of the die land below the melting point temperature of the thermoplastic resin in order to minimize and substantially prevent the occurrence of melt fracture on the exterior surface of the composite profile; and a thermal break between the die zone and the die land meant to minimize heat transfer between the die zone and the die land.

The die assembly of the present invention can also be adapted for the extrusion of hollow thermoplastic resin cellulosic fiber composite profiles without the occurrence of melt fracture. The die assembly for the production of hollow composite profiles, which have at least one longitudinal hollow channel and an interior surface, further comprises a mandrel meant to form the longitudinal hollow channels in the composite profile, wherein: the mandrel, which has an upstream portion and a downstream portion, is positioned within the flow passage through the die assembly and forms an annular flow passage that has upstream and downstream ends and is oriented along the axis of the die assembly; the mandrel is held in position by at least one mandrel support and the mandrel supports are generally perpendicular to the mandrel and to the axis of the die assembly, intersect the annular flow passage and are rigidly connected to the upstream portion of the mandrel; the downstream portion of the mandrel is comprised of at least one core and is positioned within the die land; the number of cores corresponds to the number of hollow channels in the composite profile and the cross-section of the cores generally corresponds to the cross-section of hollow channels in the composite profile; and the cores are equipped with cooling means to maintain the temperature of the cores below the melting point temperature of the thermoplastic resin in order to minimize and substantially prevent the occurrence of melt fracture on the interior surface of the composite profile.

The present invention also relates to a production process for the production of thermoplastic resin cellulosic fiber composite profiles that incorporates the improved die assembly of the present invention. The steps comprising the disclosed production process include: providing thermoplastic resin and cellulosic fiber; compounding the thermoplastic resin and cellulosic fiber to produce a composite compound; processing the composite compound at a temperature above the softening point temperature of the thermoplastic resin through an extrusion system to produce a generally homogeneous flow of melted composite compound; extruding the generally homogeneous flow of melted composite compound through the improved die assembly of this invention to form a composite profile having a desired cross-section and an exterior surface; cooling the extruded composite profile until the composite compound comprising the composite profile is solidified; and cutting the cooled composite profile to the desired length.

The invention also involves composite profiles produced by the production processes of the current invention. In one preferred embodiment, the composite compound which comprises the composite profiles produced by the production processes of this invention contains between 50% and 20% by weight of thermoplastic resin and between 50% and 80% by weight of cellulosic fibers. In another preferred embodiment, the composite compound which comprises the composite profiles produced by the production processes of this invention may also contain a processing aid, a lubricant, a stabilizer, a compatibilizer, a coupling agent, a colorant, a UV stabilizer, a flame retardant or combinations thereof.

Other features and advantages of this invention will become apparent from the following description taken in conjunction with the accompanying drawings wherein are set forth, by way of illustration and example, certain embodiments of this invention. The drawings constitute a part of this specification and include exemplary embodiments and illustrate various features and designs thereof.

BRIEF DESCRIPTION OF THE DRAWINGS

The invention will now be described by way of example only, with reference to the accompanying drawings, in which.

DETAILED DESCRIPTION OF THE INVENTION

Although the invention will be described in terms of specific embodiments, it will be readily apparent to those skilled in the art that various modifications, rearrangements and substitutions can be made without parting from the spirit of this invention.

Figure 1:
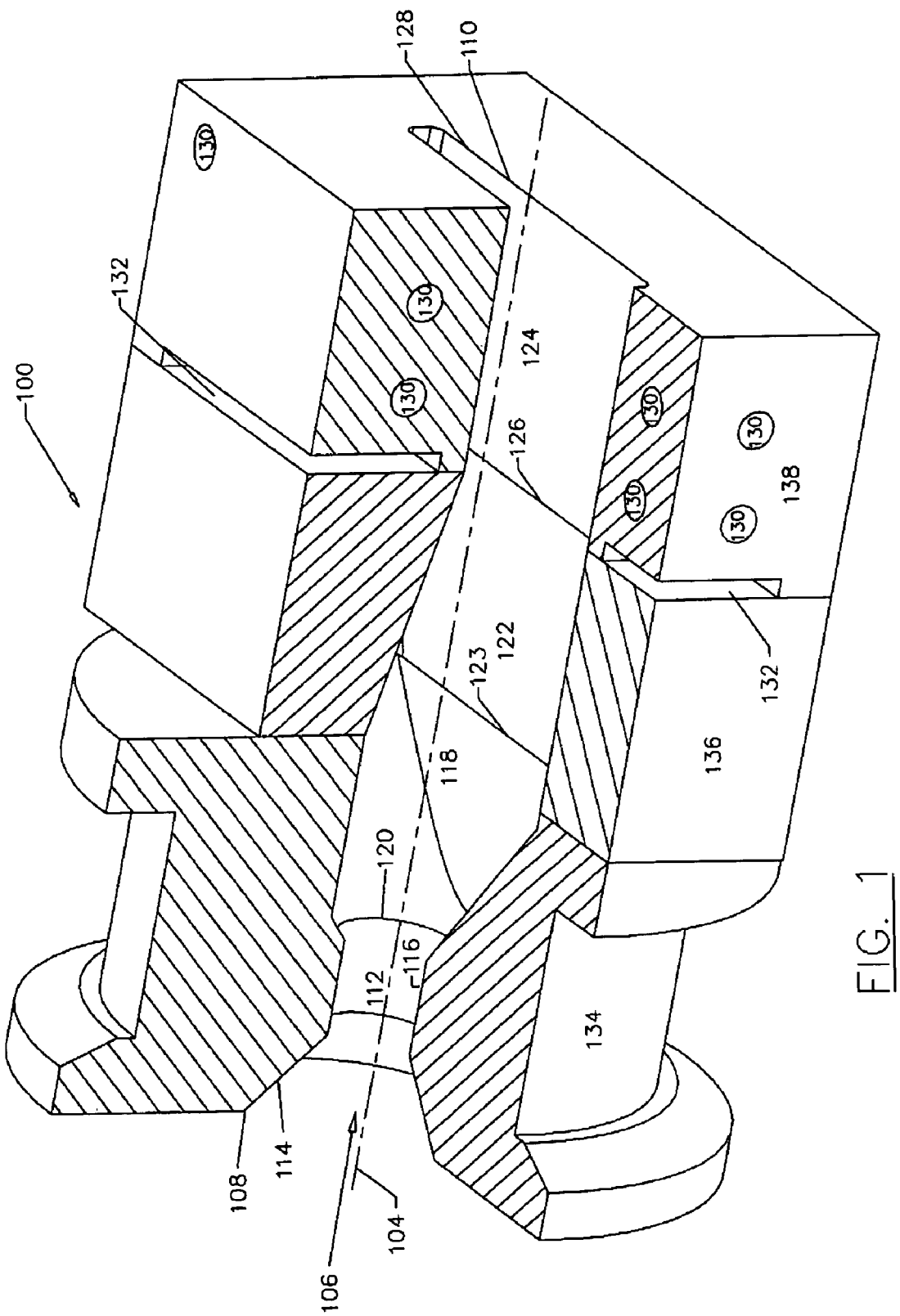
FIG. 1 shows a sectional view of one embodiment of the die assembly of the present invention for the production of a solid composite profile.
Figure 2:
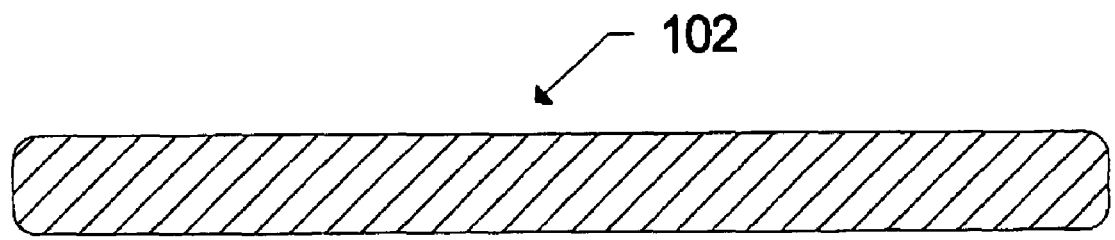
FIG. 2 shows a cross-sectional view of the profile produced by the die assembly shown in FIG. 1.

FIG. 1 shows a sectional view of one embodiment of a die assembly 100 of the present invention for the continuous production of a solid thermoplastic resin cellulosic fiber composite profile having a rectangular cross-section, while FIG. 2 shows a cross-sectional view of the solid profile 102 produced with the die assembly 100 shown in FIG. 1. The die assembly 100 has an axis 104 oriented from its upstream end to its downstream end. Located within the die assembly 100 is a balanced flow passage 106 through which composite compound is extruded from an upstream inlet 108 to a downstream outlet 110. The inlet 108 and outlet 110 are located in the upstream and downstream ends of the die assembly, respectively. The first part of the flow passage through the die assembly consists of a compression zone 112 which corresponds to at least a portion of the upstream end of the flow passage. The compression zone 112 of the die assembly shown 100 in FIG. 1 consists of a converging section 114 and a parallel section 116. The inlet of the converging section will correspond to the outlet of the extruder or a die adapter installed on the extruder. In the case that there is an adapter installed on the extruder, all or part of the compression zone might be located within the adapter, which would then be considered as part of the die assembly. The purpose of the compression zone is to consolidate the composite material as it flows from the extruder into the die assembly. This is necessary to ensure a generally homogeneous flow of the composite material through the die assembly. The portion of the die assembly 100 corresponding to the compression zone 112 is heated to a temperature above that of the melting point of the thermoplastic resin comprising the composite material.

Following the compression zone 112 in the flow passage 106 is a heated transition zone 118, where the inlet 120 of the transition zone 118 corresponds to the outlet of the compression zone. The purpose of the transition zone 118 is to pre-shape the composite material, typically to a intermediate shape similar to that of the composite profile, but having a larger cross-sectional area. Following the transition zone 118, is a heated converging die zone 122, wherein the inlet 123 of the die zone corresponds to the outlet of transition zone. The term converging, in reference to the die zone, refers to the fact that the cross-sectional area of the flow passage at the die zone inlet is larger than the cross-sectional area of the die zone outlet. The cross-section of the flow passage should change gradually and smoothly in the converging die zone from the cross-section at the end of the transition zone to the cross-section of the desired composite profile at the outlet of the die zone, so that a balanced flow of the composite material through the die assembly of the present invention is preferably maintained. Like the compression zone 112, the portions of the die assembly corresponding to the transition zone 118 and the die zone 122 are also heated to a temperature above that of the melting point of the thermoplastic resin comprising the composite material.

Following the die zone 122 is a die land 124 which corresponds to at least a portion of the downstream end of the flow passage. The inlet 126 of the die land corresponds to the outlet of the die zone and the outlet 128 of the die land corresponds to the outlet of the die assembly 110. The cross-section of flow passage in the die land 124 corresponds to the cross-section of the desired composite profile 102. The portion of the die assembly 100 corresponding to the die land 124 is provided with a cooling means to maintain the temperature of the die land below the melting point temperature of the thermoplastic resin to minimize and substantially prevent the occurrence of melt fracture on the exterior surface of the composite profile. For the die assembly 100 shown in FIG. 1, the cooling means consists of a plurality of cooling lines 130 provided in the body of die assembly 100 through which a cooling fluid can be circulated to cool the die land 124. As the portions of the die assembly of the present invention corresponding to the die zone and the die land are to be heated and cooled, respectively, it is useful to have a thermal break between the die zone and the die land meant to minimize heat transfer between those portions of the die assembly. For the die assembly 100 shown in FIG. 1, the thermal break 132 simply consists of a portion of the die assembly where the bulk of the material comprising the body of die assembly 100 has been removed in line with the die zone outlet and die land inlet 126.

While the die assembly 100 shown in FIG. 1 is constructed in three rigidly connected sections 134, 136, 138, the die assembly of the current invention can be constructed from as little as two rigidly connected sections. In a preferred embodiment of the die assembly of this invention the compression zone and transition zone can both be located in one section of the die assembly. In another preferred embodiment of the die assembly of this invention the die zone and die land are both located in one section of die assembly.

Figure 4:
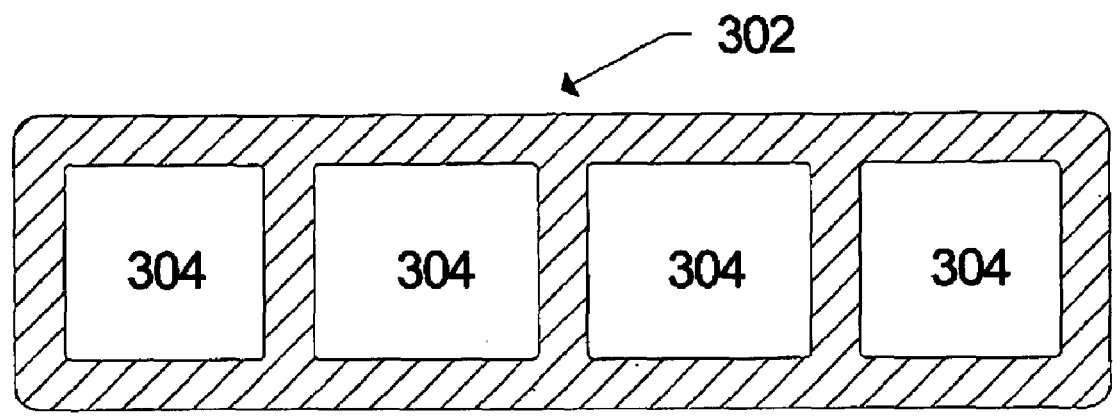
FIG. 4 shows a cross-sectional view of the profile produced by the die assembly shown in FIG. 3.
Figure 3:
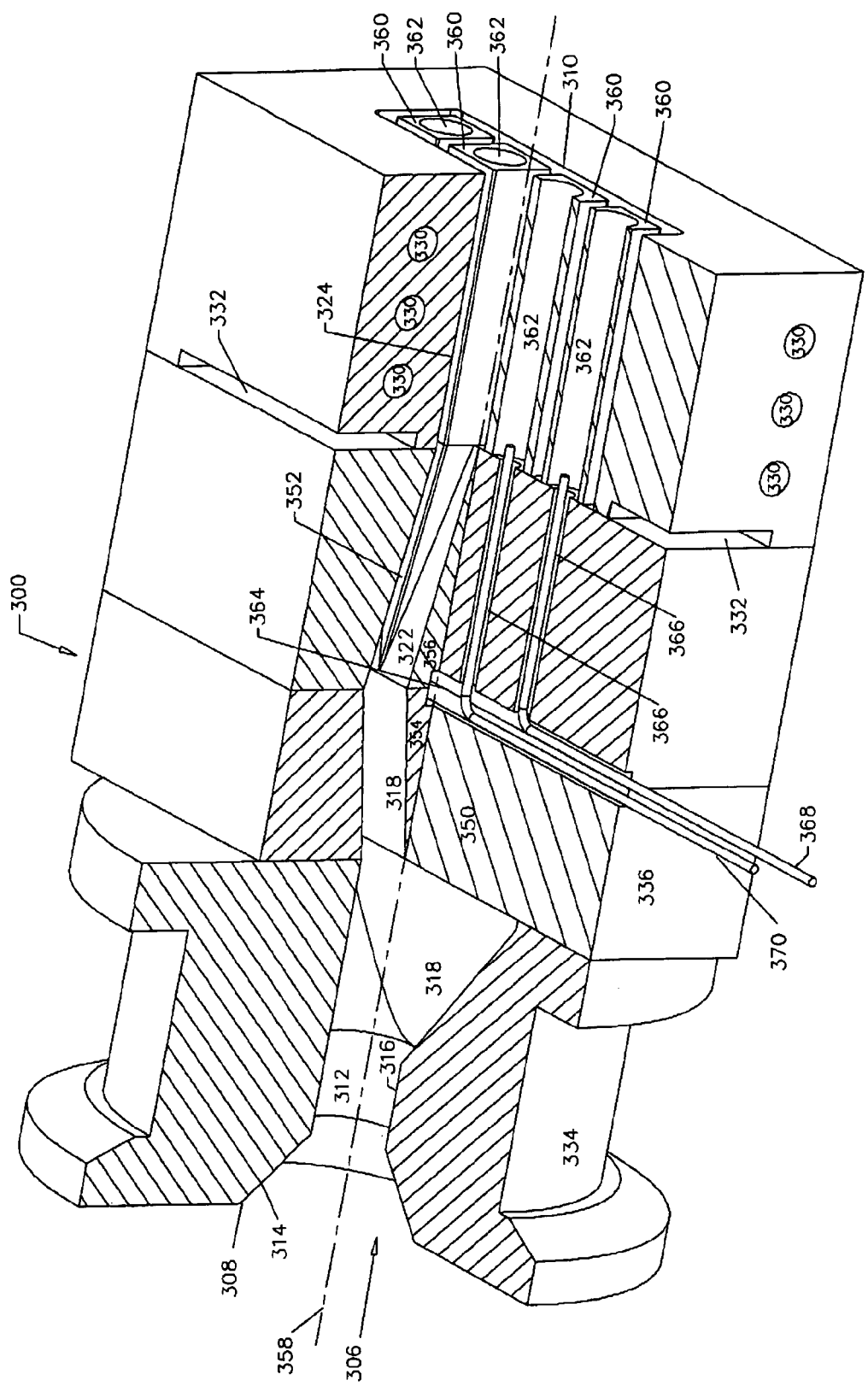
FIG. 3 shows a sectional view of an alternate embodiment of the die assembly of the present invention for the production of a hollow composite profile.
Figure 5:
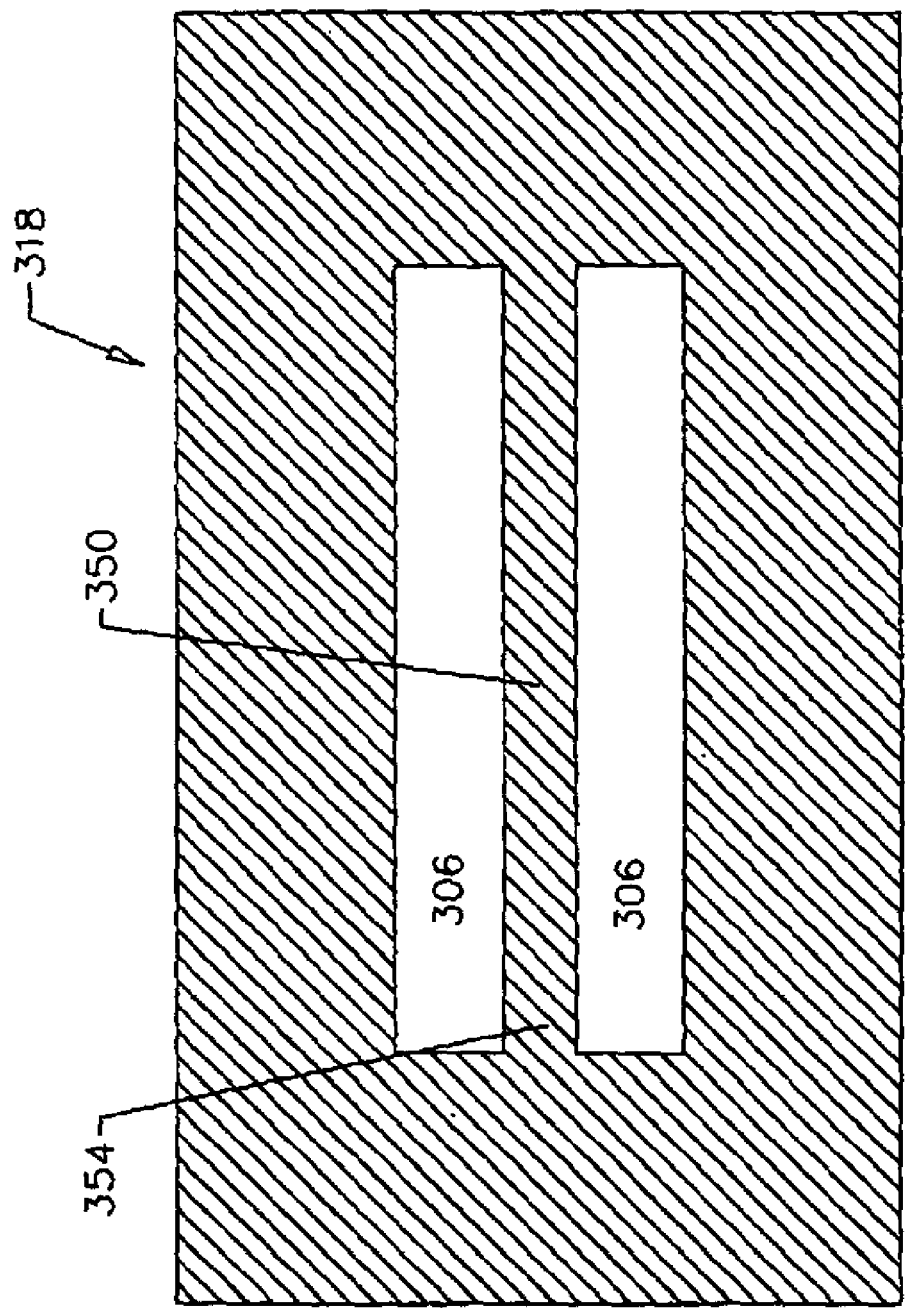
FIG. 5 shows a cross-sectional view of the transition zone of the die assembly shown in FIG. 3.
Figure 6:
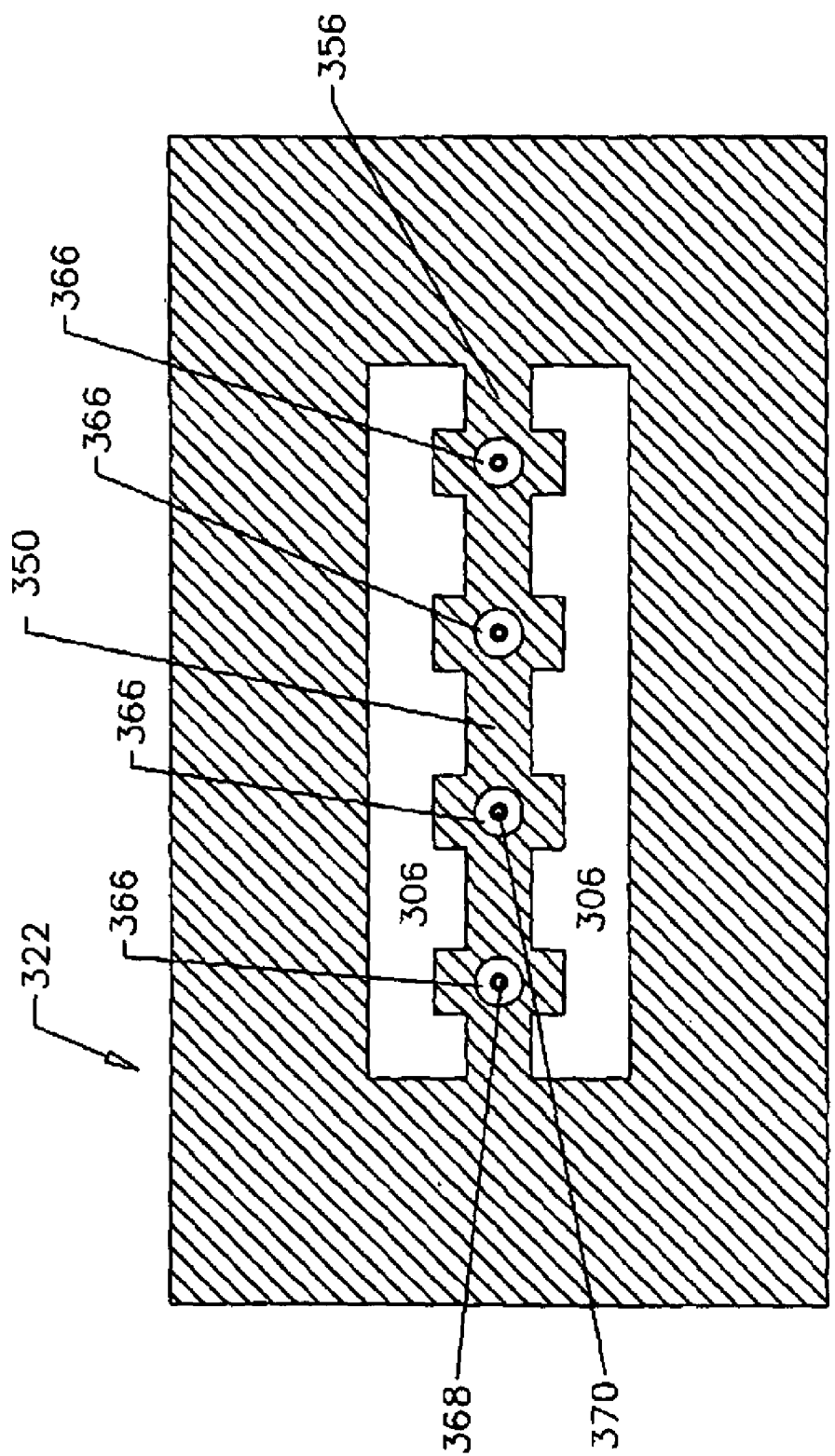
FIG. 6 shows a cross-sectional view of the die zone of the die assembly shown in FIG. 3.
Figure 7:
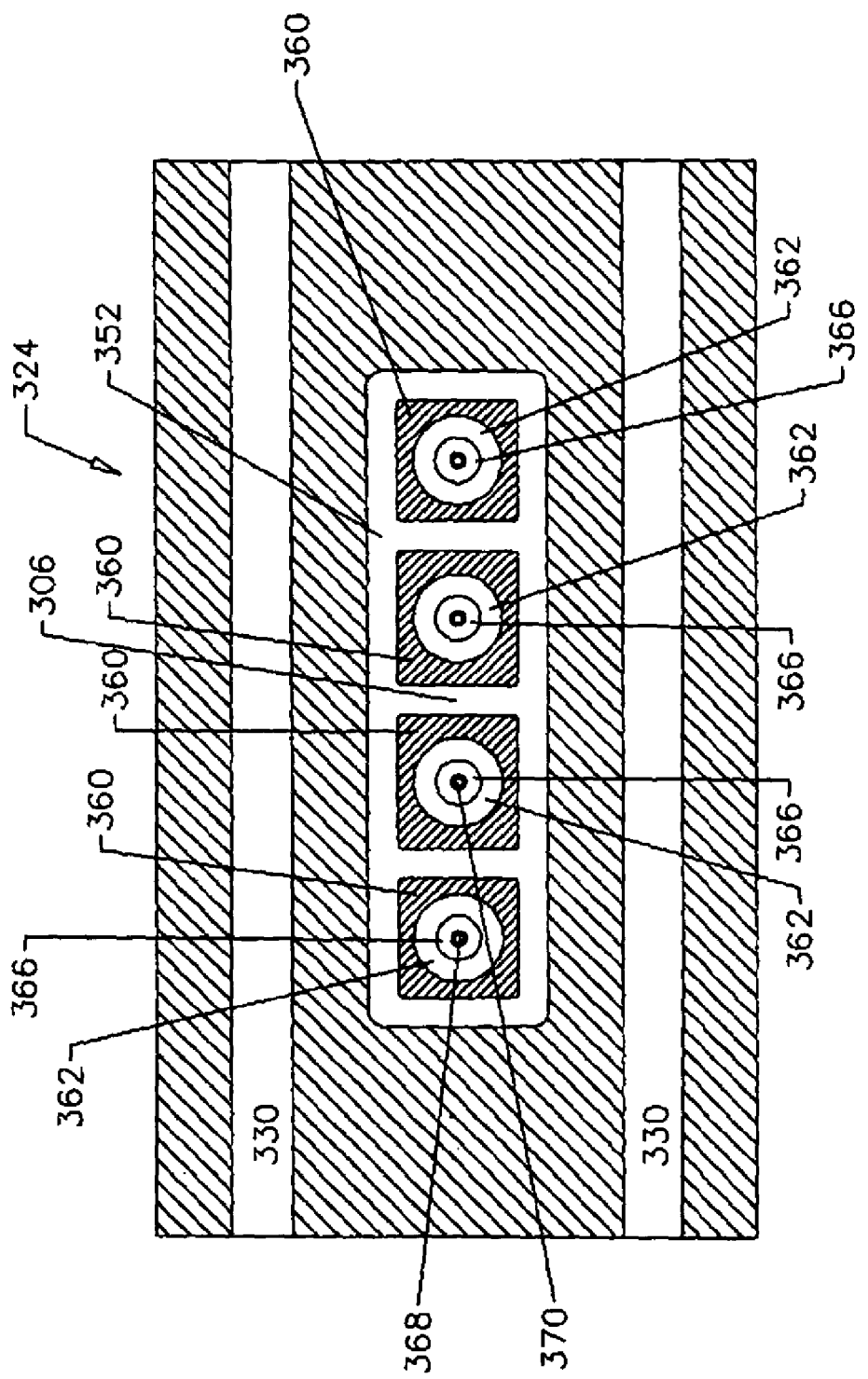
FIG. 7 shows a cross-sectional view of the die land of the die assembly shown in FIG. 3.

FIG. 3 shows a sectional view of one embodiment of a die assembly 300 of the present invention for the continuous production of a hollow thermoplastic resin cellulosic fiber composite profile, while FIGS. 5, 6 and 7 show cross-sections at different points along the die assembly shown in FIG. 3. FIG. 4 shows a cross-sectional view of the hollow profile 302 produced with the die assembly 300 shown in FIG. 3. The profile 302 has a rectangular cross-section and four longitudinal hollow channels 304. Like the die assembly 100 shown in FIG. 1 for the production of the solid composite profile 102, the die assembly 300 for the production of a hollow profile 302 shown in FIG. 3 has a balanced flow passage 306 through which composite compound is extruded from an upstream inlet 308 to a downstream outlet 310 which consists of a compression zone 312 with a converging 314 and parallel 316 sections, a transition zone 318, a die zone 322 and a die land 324. The portions of the die assembly which correspond to the compression zone 312, transition zone 318, and die zone 322 are heated to a temperature above that of the melting point of the thermoplastic resin comprising the composite material, while the portion of the die assembly corresponding to the die land 324 is provided with a cooling means to maintain the temperature of the die land below the melting point temperature of the thermoplastic resin to minimize and substantially prevent the occurrence of melt fracture on the exterior surface of the composite profile. For the die assembly 300 shown in FIG. 3, the cooling means consists of cooling lines 330 provided in the body of die assembly 300 through which a cooling fluid can be circulated to cool the die land 324. The die assembly 300 shown in FIG. 3 is also provided with a thermal break 332 between the portions of the die assembly 300 corresponding to the heated die zone 322 and the cooled die land 324, for the reasons discussed above.

However, unlike the die assembly 100 shown in FIG. 1, the die assembly 300 shown in FIG. 3 is provided with a mandrel 350 which is meant to form the longitudinal hollow channels 304 in the hollow profile 302 shown in FIG. 4. The mandrel 350, which has an upstream portion and a downstream portion, is positioned within the balanced flow passage 306. The inclusion of a mandrel within the flow passage of the die assembly of the present invention results in an annular flow passage oriented along the axis of the die assembly. As shown in FIG. 3, 5 and 6, the mandrel 350 is held in position by mandrel supports 354, 356. The mandrel supports 354, 356 are generally perpendicular to the mandrel 350 and the axis 358 of the die assembly and intersect the annular flow passage 352. The mandrel supports 354, 356 are rigidly connected to the upstream portion of the mandrel 350 and to the body of the die assembly 300 and are generally positioned within the transition zone 318 and die zone 322 of the flow passage 306. For the die assembly 300, the transition zone 318 is located in two separate sections 334, 336 of the die assembly 300, unlike the transition zone 118 of the die assembly 100, which is located in only one section of the die assembly 100.

For the die assembly 300 shown in FIGS. 3 and 7, the downstream portion of the mandrel is comprised of four cores 360 positioned within the die land portion of the balanced flow passage 306. For the die assembly of the present invention, the number of cores corresponds to the number of hollow channels in the desired hollow composite profile and the cross-section of the cores generally corresponds to the cross-section of hollow channels in the composite profile. In the construction of the die assembly, and more specifically the mandrel, the mandrel can be constructed such that the cores are an integral part of the mandrel or that the cores are made separately and rigidly attached to the upstream portion of the mandrel. Additionally, the mandrel may also consist of two sections, one which has mandrel supports in the transition zone and one which has mandrel supports in the converging die zone. Each of the cores is equipped with a cooling means to maintain the temperature of the cores below the melting point temperature of the thermoplastic resin in order to minimize and substantially prevent the occurrence of melt fracture on the interior surfaces of the hollow composite profile. The die assembly 300 shown in FIGS. 3 and 7 is provided with a cooling means that consists of hollow channels 362 in each of the cores 360, which are parallel to the die assembly axis 358 and are open at the downstream end, a hollow channel 364 perpendicular to the die assembly axis 358 that is positioned in the mandrel supports 354, 356, channels 366 connecting the hollow channels 362 in the cores 360 to the perpendicular hollow channel 364, and tubes 368, 370 that are inserted through the perpendicular hollow channel 364 and the connecting hollow channels 366 that are used to spray cooling fluid into the hollow channels 362 in the cores 360.

In one preferred embodiment of the die assembly for the production a hollow profiles, the die assembly may be constructed such that the cross-section of the annular flow passage at die zone outlet and the cross-section of the annular flow passage along the full length of the die land corresponds to the cross-section of the hollow composite profile, i.e. the inside surface of the die land and the outside surfaces of the cores are parallel to each other and the axis of the die assembly.

Figure 8:
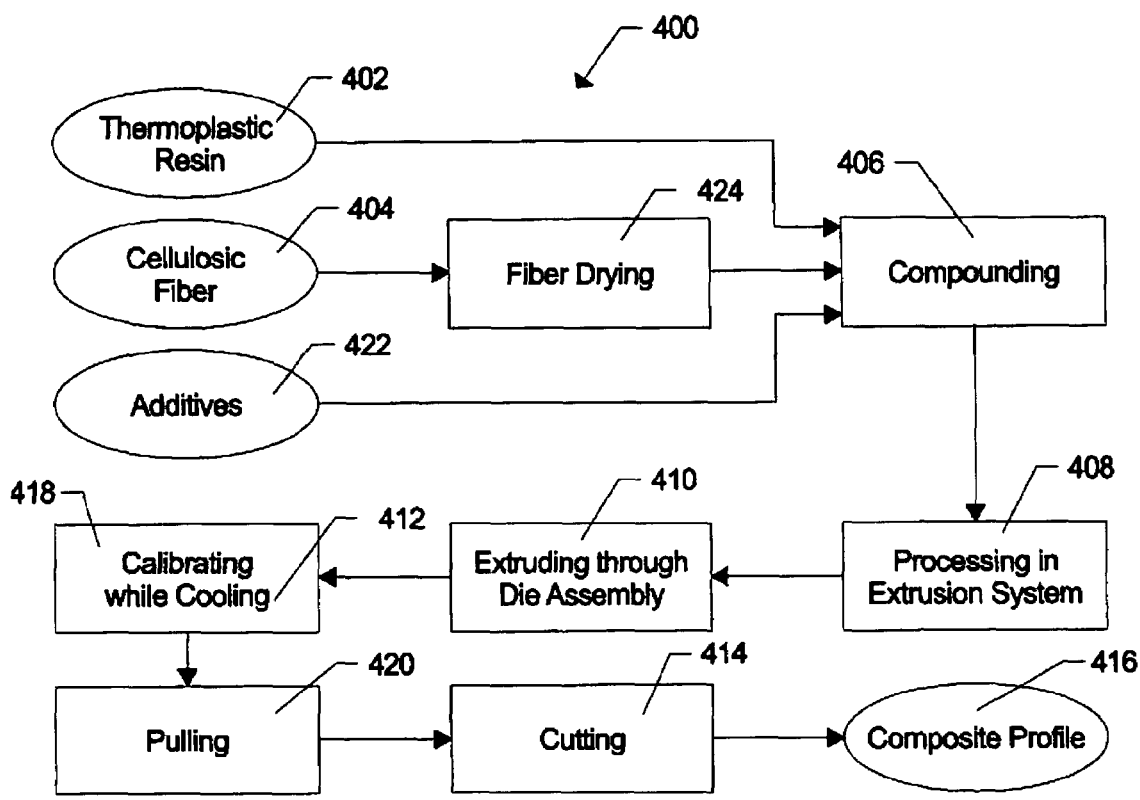
FIG. 8 shows a schematic diagram of a preferred embodiment of the process of the present invention.

The improved die assembly of the current invention is meant to be used in a production process for the production of thermoplastic resin cellulosic fiber composite profiles. One preferred embodiment of the production process of the present invention includes a number of distinct steps which are shown generally at 400 in schematic form in FIG. 8. The first step involves providing thermoplastic resin 402 and cellulosic fiber 404. The next step of the process is to compound 406 the thermoplastic resin and cellulosic fiber to produce a composite compound. In this invention compounding 406 refers to the mixing of the cellulosic fibers with melted thermoplastic resin and can be achieved by one of the many methods known in the art for producing thermoplastic compounds. The following step of the production process involves processing 408 the composite compound at a temperature above the softening point temperature of the thermoplastic resin through an extrusion system to produce a generally homogeneous flow of melted composite compound. In one preferred embodiment of the composite profile production process of the present invention, the compounding step 406 may be a separate process which occurs prior to the step of processing 408 the composite compound through the extrusion system, while in another preferred embodiment, the steps of compounding 406 and processing 408 the composite compound through an extrusion system are parts of the same continuous process. An appropriate extrusion system can consist of any one of the types of extruders commonly used for processing thermoplastic resins and compounds including single screw extruders, parallel co-rotating twin screw extruders, parallel counter-rotating twin screw extruders and conical counter-rotating twin screw extruders. It is also possible to have an extrusion system which is a combination of two different types of extruders, particularly in the case where the extrusion system is meant to both compound the thermoplastic resin and the cellulosic fiber and to produce a generally homogeneous flow of melted composite compound. Examples of these kinds of systems include a parallel co-rotating twin screw extruder combined with a single screw extruder, a single screw extruder combined with a parallel counter-rotating twin screw extruder or two parallel counter-rotating twin screw extruders working together.

The next step of the production process of the present invention involves extruding 410 the generally homogeneous flow of melted composite compound from the extruder through a die assembly of the present invention described above to form a composite profile with the desired cross-section. Once the composite profile is formed, the next step of the production process is to cool 412 the extruded composite profile until the composite compound comprising the composite profile is completely solidified. The step of cooling 412 the extruded composite profile typically involves the use of a cooling tank such as is known in the art, wherein the profile is either sprayed with a cooling fluid or immersed in a bath of cooling fluid, or both sprayed and immersed in a bath of cooling fluid. The final step of the process involves cutting 414 the cooled composite profile 416 to the desired length. This can be done with a cut-off saw such as are known in the art.

In the case when it is desired to produce a hollow composite profile by the production process of the present invention, the die assembly should be equipped with a mandrel as described above. In addition, when it is desired to produce a hollow profile, the step of cooling 412 will include calibrating 418 the extruded composite profile using vacuum calibration tooling and pulling 420 the profile with a puller, such as is known in the art. The purpose of the vacuum calibration tooling is to maintain the desired shape of the profile while it cools and to prevent any distortion of the profile until it is sufficiently hard to hold its shape, i.e. the composite compound comprising the profile has solidified. The puller is used to overcome the drag on the surface of the composite profile caused by the calibration tooling, as the profile is not sufficiently stiff exiting the die assembly for it to be pushed through the calibration tooling.

When producing hollow composite profiles, in addition to spraying the cooling fluid though the tubes into the cores to cool them, the cooling fluid can also be sprayed on the interior surface of the hollow composite profile in order to provide additional cooling of the composite profile. Appropriate cooling fluids used to cool the cores and the profile consists of liquids, gasses, vapors and mixtures thereof. In one preferred embodiment of the present invention, the cooling fluid is a mixture of air and water. This mixture is particularly effective in cooling the cores in that the evaporation of the water, once it is dispersed by the air in the hollow channels in the cores, will remove more heat than just a flow of air and the air will carry the evaporated water away from the cores and down the hollow channels in the profile, preventing saturation of the air within the cores which could limit evaporation. Additionally, as the water condenses in the hollow channels of the profile, it can provide additional cooling. In another preferred embodiment, the cooling fluid consists of mixtures of gaseous and cryogenically liquified air, nitrogen, carbon dioxide, etc. These mixtures are very effective in cooling the cores due the evaporation of the cryogenic liquid and because the gaseous component helps to disperse the cryogenic liquid into the cores and onto the interior surfaces of the hollow profile and carries the evaporated liquid away from the cores.

In addition to the thermoplastic resin and the cellulosic fiber provided in the first step of the production process, any one of a number of additives 422 or combination of additives that are commonly used in the processing and production of thermoplastic resins, compounds and products might also be added to the composite compound. Examples of the types of additives that may be used in the production process of the present invention include processing aids or lubricants to improve the flowability of the composite compound, stabilizers to prevent degradation of the thermoplastic resin during processing, a compatibilizer or a coupling agent to improve the dispersion of and bond between the cellulosic fiber and the thermoplastic resin, various colorants to produce different colored composite profiles, UV stabilizer to protect the composite profile from degradation due to exposure to sunlight, or flame retardants to reduce the flammability of the composite profiles.

As to the choice of the thermoplastic resin comprising the composite profiles produced with the die assemblies and the production processes of the present invention, the resin can be a virgin material, a recycled material or a mixture of virgin and recycled material. The thermoplastic resin chosen may be polyethylene (PE), polypropylene (PP), polystyrene (PS) or polyvinyl chloride (PVC or vinyl), however in a preferred embodiment of the present invention, the thermoplastic resin is a high density polyethylene. The kinds of cellulosic fibers used in the production processes of the present invention are derived by the comminution or attrition by grinding or milling of wood, plant matter or agricultural byproducts such as hulls, husks, shells and straws to produce discrete fibers or cellulosic particles. Cellulosic fibers which are a byproduct of paper production or recycling may also be used. In another preferred embodiment of the composite profile production process of the present invention, the step of providing the thermoplastic resin and the cellulosic fiber includes the step of drying 424 the cellulosic fiber to a moisture content of less than about 2% by weight. This can be done with any of the different kinds of dryers used to dry particulate material known in the art. As to the relative amounts of cellulosic fiber and thermoplastic resin, the cellulosic fibers typically comprise between 50% and 80% by weight of the composite compound comprising the composite profile, while the thermoplastic resin typically comprises between 20% and 50% by weight.

As used herein, the terms "comprises" and "comprising" are to be construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

It is to be understood that while certain embodiments of this invention have been described above, the invention is not to be limited to the specific embodiments shown and described. It will be apparent to those skilled in the art that various changes may be made without departing from the scope of the invention and the invention is not to be considered limited to what is shown in the drawings and described in the specification.

What is claimed as the invention is:

1. An extrusion die assembly for the continuous production of a composite profile comprising composite compound comprising thermoplastic resin and cellulosic fiber and having a desired cross-section and an exterior surface, wherein the die assembly has an axis oriented from an upstream end to a downstream end, said die assembly comprising:
   a. a flow passage which results in a generally balanced flow of the composite compound from an upstream die assembly inlet to a downstream die assembly outlet, wherein the die assembly inlet and outlet are displaced along said axis;
   b. a compression zone of the flow passage having an inlet and an outlet, wherein the compression zone corresponds to at least a portion of the upstream end of the flow passage and the compression zone inlet corresponds to the die assembly inlet;
   c. a transition zone of the flow passage having an inlet and an outlet, wherein the transition zone inlet corresponds to the compression zone outlet;
   d. a converging die zone of the flow passage having an inlet and an outlet, wherein the converging die zone inlet corresponds to the transition zone outlet and the converging die zone outlet generally corresponds to the cross-section of the composite profile;
   e. a die land having an inlet and an outlet, wherein the die land corresponds to at least a portion of the downstream end of the flow passage, the die land inlet corresponds to the converging die zone outlet, the die land outlet corresponds to the outlet of the die assembly and the cross-section of die land outlet corresponds to the cross-section of the composite profile;
   f. a compression section, a transition section, a converging die section and a die land section of the die assembly, wherein the compression, transition, converging die and die land sections comprise sections of the die assembly obtained by passing a series of parallel planes perpendicular to said axis through the die assembly at the inlets and outlets of the compression, transition and converging die zones and the die land, respectively, wherein the die land section forms the exterior surface of the composite profile;
   g. cooling means positioned in the die land section to maintain the temperature of the die land section at a temperature below the melting point temperature of the thermoplastic resin; and
   h. heating means to maintain the temperature of the compression, transition and converging die sections at a temperature above the melting point temperature of the thermoplastic resin.

2. The die assembly of claim 1 further including a thermal break between the converging die section and the die land section adapted to minimize heat transfer between the heated converging die section and the cooled die land section.

3. The die assembly of claim 1, wherein the cooling means consists of cooling lines provided in the die land section which circulate a cooling fluid adapted to maintain the temperature of the die land section below the melting point temperature of the thermoplastic resin.

4. The die assembly of claim 1, wherein the die assembly is constructed with at least two rigidly connected die assembly sections that are displaced along said axis.

5. The die assembly of claim 4, wherein the compression section and the transition section comprise one die assembly section.

6. The die assembly of claim 4, wherein the converging die section and die land section comprise one die assembly section.

7. The extrusion die assembly of claim 1, wherein the composite profile is hollow and has at least one longitudinal hollow channel with an interior surface and the die assembly further comprises a mandrel adapted to form said longitudinal hollow channels, wherein:
   a. the mandrel, having an upstream portion and a downstream portion, is positioned within the flow passage forming an annular flow passage oriented along said die assembly axis, wherein the annular flow passage has an upstream end and a downstream end;
   b. the mandrel is held in position by at least one mandrel support, wherein each mandrel support is generally perpendicular to the mandrel and to said axis, intersects the annular flow passage and is rigidly connected to the upstream portion of the mandrel; and c. the downstream portion of the mandrel is comprised of at least one core with an exterior surface and is positioned within the die land section, wherein the exterior surface of each core forms the interior surface of one of said hollow channels and is equipped with core cooling means positioned in the core to maintain the temperature of the cores below the melting point temperature of the thermoplastic resin.

8. The die assembly of claim 7, wherein the cross-section of the annular flow passage at the converging die zone outlet and the cross-section of the annular flow passage along the full length of the die land corresponds to the cross-section of the hollow composite profile.

9. The die assembly of claim 7, wherein the cooling means consists of cooling lines provided in the die land section which circulate a cooling fluid adapted to maintain the temperature of the die land section below the melting point temperature of the thermoplastic resin.

10. The die assembly of claim 7, wherein said core cooling means comprises:

a. at least one hollow channel in each of the cores, wherein each of said hollow channels is parallel to said die assembly axis and open at the downstream end of the core;

b. at least one hollow channel generally perpendicular to the said die assembly axis positioned within a mandrel support, wherein each of the hollow channels in the cores is connected to at least one of the perpendicular hollow channels; and c. at least one tube inserted through the perpendicular hollow channels and the connecting hollow channels, wherein each tube is used to spray a cooling fluid into the each of the hollow channels in each of the cores.

11. The die assembly of claim 10, wherein the cooling means consists of cooling lines provided in the die land section which circulate a cooling fluid adapted to maintain the temperature of the die land section below the melting point temperature of the thermoplastic resin.

* * * * *